(12) United States Patent
Thiele

(10) Patent No.: US 7,824,486 B2
(45) Date of Patent: Nov. 2, 2010

(54) PAPER LAMINATES

(75) Inventor: Erik Shepard Thiele, Genolier (CH)

(73) Assignee: E. I. du Pont de Nemours and Company, Wilmington, DE (US)

( * ) Notice: Subject to any disclaimer, the term of this patent is extended or adjusted under 35 U.S.C. 154(b) by 1407 days.

(21) Appl. No.: 11/236,366

(22) Filed: Sep. 27, 2005

(65) Prior Publication Data

US 2007/0071989 A1 Mar. 29, 2007

(51) Int. Cl.
- *C09C 1/04* (2006.01)
- *C09C 1/36* (2006.01)
- *C01G 23/00* (2006.01)

(52) U.S. Cl. .................. 106/430; 106/436; 106/442; 106/447; 423/76; 423/598

(58) Field of Classification Search ......... 106/430–431, 106/442–443, 426, 428, 436, 447; 423/76, 423/598

See application file for complete search history.

(56) References Cited

U.S. PATENT DOCUMENTS

| | | | |
|---|---|---|---|
| 3,418,147 A | 12/1968 | Fields | |
| 3,523,809 A | 8/1970 | Holbein et al. | |
| 3,853,575 A | 12/1974 | Holle et al. | |
| 3,926,660 A | 12/1975 | Holle et al. | |
| 3,946,134 A | 3/1976 | Sherman | |
| 4,052,224 A | 10/1977 | Howard | |
| 4,400,365 A | 8/1983 | Haacke et al. | |
| 5,114,486 A * | 5/1992 | Demosthenous et al. | 106/443 |
| 5,165,995 A | 11/1992 | Losoi | |
| 5,665,466 A | 9/1997 | Guez et al. | |
| 5,785,648 A | 7/1998 | Min | |
| 5,785,748 A * | 7/1998 | Banford et al. | 106/443 |
| 5,942,281 A | 8/1999 | Guez et al. | |
| 5,976,237 A | 11/1999 | Halko et al. | |
| 6,225,014 B1 * | 5/2001 | Patterson et al. | 430/64 |
| 6,342,099 B1 | 1/2002 | Hiew et al. | |
| 6,395,081 B1 | 5/2002 | Hiew et al. | |
| 6,962,622 B2 * | 11/2005 | Bender et al. | 106/442 |
| 7,166,157 B2 | 1/2007 | Drews-Nicolai et al. | |
| 2004/0025749 A1 | 2/2004 | Drews-Nicolai et al. | |
| 2007/0068423 A1 | 3/2007 | Thiele | |
| 2007/0071989 A1 | 3/2007 | Thiele | |
| 2008/0160267 A1 | 7/2008 | Thiele et al. | |
| 2008/0308009 A1 | 12/2008 | Thiele | |

FOREIGN PATENT DOCUMENTS

| | | | |
|---|---|---|---|
| EP | 0450805 | | 10/1994 |
| EP | 0753546 | | 1/1997 |
| GB | 1157318 | | 7/1969 |
| GB | 1422575 | | 1/1976 |
| JP | 62048775 | | 8/1993 |
| WO | WO2004/018568 | | 3/2004 |
| WO | WO2004/061013 | * | 7/2004 |

* cited by examiner

*Primary Examiner*—Sheeba Ahmed

(57) ABSTRACT

The present disclosure relates to a process for making a decorative base paper for a paper laminate comprising impregnating a base paper with a pigment mixture of titanium dioxide and water wherein the titanium dioxide pigment is made by treating a mixture of titanium dioxide pigment and water with a source of phosphorus and a source of aluminum; drying the treated mixture to form a treated pigment, the treated pigment having surface hydroxyl groups; and removing a major proportion of the surface hydroxyl groups of the treated pigment. Preferably the surface hydroxyl groups are removed by thermal treatment, for example at temperatures ranging from 300° C. to 800° C. The source of phosphorus is typically phosphoric acid and the source of aluminum is typically sodium aluminate. The pigment can be characterized by an isoelectric point which is greater than pH 6 and a negative zeta potential of at least 20 mV at a pH of 7.5 or more and wherein the pigment has improved light fastness.

7 Claims, No Drawings

PAPER LAMINATES

CROSS-REFERENCE TO RELATED APPLICATIONS

Cross-reference is made to related application Ser. No. 11/236,158 filed on the same date herewith which is incorporated herein by reference in its entirety.

BACKGROUND OF THE DISCLOSURE

Titanium dioxide pigments are used in many applications. One particular application demanding light fastness is the use in paper incorporated into paper laminates for decorative applications.

Paper laminates are in general well-known in the art, being suitable for a variety of uses including table and desk tops, countertops, wall panels, floor surfacing, tableware, outdoor applications, and the like. Paper laminates have such a wide variety of uses because they can be made to be extremely durable, and can be also made to resemble (both in appearance and texture) a wide variety of construction materials, including wood, stone, marble and tile, and can be decorated to carry images and colors.

Typically, the paper laminates are made from papers by impregnating the papers with resins of various kinds, assembling several layers of one or more types of laminate papers, and consolidating the assembly into a unitary core structure while converting the resin to a cured state. The type of resin and laminate paper used, and composition of the final assembly, are generally dictated by the end use of the laminate.

Decorative paper laminates can be made by utilizing a decorated paper layer as upper paper layer in the unitary core structure. The remainder of the core structure typically comprises various support paper layers, and may include one or more highly-opaque intermediate layers between the decorative and support layers so that the appearance of the support layers does not adversely impact the appearance of decorative layer.

Paper laminates may be produced by both low- and high-pressure lamination processes.

Various methods can be employed to provide paper laminates by low-pressure lamination. For example, a single opening, quick cycle press can be used where one or more resin-saturated paper sheets are laminated to a sheet of plywood, particle board, or fiberboard. A "continuous laminator" can be used where one or more layers of the resin-saturated paper are pressed into a unitary structure as the layers move through continuous laminating equipment between plates, rollers or belts. Alternatively, a laminated sheet (continuous web or cut to size) may be pressed onto a particle or fiberboard, etc. and a "glue line" used to bond the laminated sheet to the board. Single or multiple opening presses may also be employed which contain several laminates.

In making paper laminates via high-pressure lamination, a plurality of sheets are impregnated with a thermosetting resin and stacked in superimposed relation, optionally with a decorative sheet placed on top. This assembly is then heat and pressure consolidated at pressures of at least about 500 psi. Generally, more than one laminate is formed at one time by inserting a plurality of sheet assemblies in a stack with each assembly being separated by a release medium which allows the individual laminates to be separated after heat and pressure consolidation. The laminates so formed are then bonded to a substrate, such as plywood, hardboard, particle board, fiberboard, composites and the like, by the use of adhesives such as contact adhesives, urea-formaldehyde, white glues (polyvinyl acetate emulsions), hot melts, phenolic or resorcinol formaldehyde, epoxy, coal tar, animal glues and the like.

It has been found desirable during the production of such laminates, by either low- or high-pressure lamination processes, to impart abrasion-resistant characteristics to the decorative surface portion of the laminate to enhance the utility of such laminates in end-use applications such as table and countertops, wall panels and floor surfacing. Such abrasion resistance can, for example, be imparted to paper laminates by means of an applied overlay sheet that provides a barrier over the print sheet. If the print sheet is decorative, the overlay should be substantially transparent. Abrasion-resistant resin coatings have also been applied to the surface of the laminate.

It has also been found desirable to impart moisture barrier properties to the base of such paper laminates, which can be done by bonding a moisture-barrier layer to the base of the laminate.

Examples of such paper laminates may be found, for example, in U.S. RE30233, U.S. Pat. No. 4,239,548, U.S. Pat. No. 4,599,124, U.S. Pat. No. 4,689,102, U.S. Pat. No. 5,425,986, U.S. Pat. No. 5,679,219, U.S. Pat. No. 6,287,681, U.S. Pat. No. 6,290,815, U.S. Pat. No. 6,413,618, U.S. Pat. No. 6,551,455, U.S. Pat. No. 6,706,372, U.S. Pat. No. 6,709,764, U.S. Pat. No. 6,761,979, U.S. Pat. No. 6,783,631 and US2003/0138600, the disclosures of which are incorporated by reference herein for all purposes as if fully set forth.

The papers in such paper laminates generally comprises a resin-impregnated, cellulose pulp-based sheet, with the pulp being based predominantly on hardwoods such as eucalyptus, sometimes in combination with minor amounts of softwood pulps. Pigments (such as titanium dioxide) and fillers are added in amounts generally up to and including about 45 wt % (based on the total dry weight prior to resin impregnation) to obtain the required opacity. Other additives such as wet-strength, retention, sizing (internal and surface) and fixing agents may also be added as required to achieve the desired end properties of the paper. Resins used to impregnate the papers include, for example, diallyl phthalates, epoxide resins, urea formaldehyde resins, urea-acrylic acid ester copolyesters, melamine formaldehyde resins, melamine phenol formaldehyde resins, phenol formaldehyde resins, poly(meth)acrylates and/or unsaturated polyester resins.

Examples of papers used in paper laminates may be found in U.S. Pat. No. 6,599,592 (the disclosure of which is incorporated by reference herein for all purposes as if fully set forth) and the above-incorporated references, including but not limited to U.S. Pat. No. 5,679,219, U.S. Pat. No. 6,706,372 and U.S. Pat. No. 6,783,631.

As indicated above, the paper typically comprises a number of components including, for example, various pigments, retention agents and wet-strength agents. The pigments, for example, impart desired properties such as opacity and whiteness to the final paper, and a commonly used pigment is titanium dioxide that is, in a relative sense, expensive in nature. Retention aids are added in order to minimize losses of titanium dioxide and other fine components during the papermaking process, which adds cost, as do the use of other additives such as wet-strength agents.

It has been found that in paper laminates, particularly in high-pressure paper laminates, the titanium dioxide pigment on exposure to UV light tends to turn from white to gray. Lightfast titanium dioxide pigment which resists graying on exposure to UV light is highly desirable. In non-lightfast titanium dioxide pigment, the UV light stimulates the formation of $Ti^{3+}$ ions, which in turn impart a grayish color to the TiO$_2$. Lightfast titanium dioxide pigments are usually surface treated to minimize this effect.

BRIEF SUMMARY OF THE DISCLOSURE

In a first aspect, the disclosure provides a process for making a decorative base paper for a paper laminate comprising impregnating a base paper with a pigment mixture of titanium dioxide and water wherein the titanium dioxide pigment is made by:
(a) treating a mixture of titanium dioxide pigment and water with a source of phosphorus and a source of aluminum;
(b) drying the treated mixture to form a treated pigment, the treated pigment having surface hydroxyl groups; and
(c) removing a major proportion of the surface hydroxyl groups of the treated pigment.

The disclosure is further directed to a process for making a decorative base paper for a paper laminate comprising impregnating a base paper with a pigment mixture of titanium dioxide and water wherein the titanium dioxide pigment is made by:
(a) treating a mixture of titanium dioxide pigment and water with a source of phosphorus and a source of aluminum;
(b) drying the treated mixture to form a treated pigment;
(c) thermally treating the treated pigment at a temperature ranging from about 300° C. to about 800° C.

In yet another embodiment, the disclosure is directed to a process for making a decorative base paper for a paper laminate comprising impregnating a base paper with a pigment mixture of titanium dioxide and water wherein the titanium dioxide pigment is made by:
(a) contacting dry titanium dioxide pigment with water to form a mixture having a pigment concentration of from about 14 to 40 weight percent based on the weight of the mixture then adjusting the pH of this mixture to about 7 with aqueous sodium hydroxide;
(b) heating the mixture to a temperature of about 40° C.;
(c) adding to the heated mixture at a rate such that the pH of the resulting mixture is maintained at about 7 throughout this step (c) from about 0.15 to 0.65 moles of phosphoric acid per kilogram of dry pigment and at least a portion of sodium aluminate aqueous solution required to react with the phosphoric acid to form aluminum phosphate;
(d) adding any remaining aqueous sodium aluminate solution required to react with unreacted phosphoric acid added in step (c) to complete the formation of aluminum phosphate simultaneously with a solution of hydrochloric acid wherein the rate of addition of aluminate solution and that of the acid solution is adjusted so that the pH of the resulting mixture from and in this step (d) is maintained in a range from 5 to 8;
(e) drying the mixture to form a treated pigment; and
(f) thermally treating the treated pigment for at least about 0.25 hour at a temperature of about 300° C. to about 800° C.; whereby the treated pigment exhibits an improvement in light fastness corresponding to a decrease in delta E* (color change) of at least about 40% compared to pigment treated through step (e).

In a second aspect, the invention is directed to a decorative base paper for a paper laminate comprising a base paper impregnated with a pigment mixture of titanium dioxide and water wherein the titanium dioxide pigment is a light fast titanium dioxide pigment comprising a thermally treated titanium dioxide having an inorganic surface treatment comprising a source of phosphorus and a source of aluminum wherein the pigment is characterized by an isoelectric point which is greater than pH 6 and a negative zeta potential of at least 20 mV at a pH of 7.5 or more, and wherein the thermal treatment comprises exposing the inorganic treated titanium dioxide to a temperature of about 300° C. to about 800° C.

Still further the disclosure is directed to a decorative base paper for a paper laminate comprising a base paper impregnated with a pigment mixture of titanium dioxide and water, wherein the titanium dioxide comprises thermally treated titanium dioxide pigment having an inorganic surface treatment comprising an aluminum phosphate wherein the pigment is characterized by an isoelectric point which is greater than pH 6 and a negative zeta potential of at least 20 mV at a pH of 7.5 or more, made by a process comprising:
(a) contacting dry titanium dioxide pigment with water to form a mixture having a pigment concentration of from about 14 to 40 weight percent based on the weight of the mixture then adjusting the pH of this mixture to about 7 with aqueous sodium hydroxide;
(b) heating the mixture to a temperature of about 40° C.;
(c) adding to the heated mixture, at a rate such that the pH of the resulting mixture is maintained at about 7 throughout this step (c), from about 0.15 to 0.65 moles of phosphoric acid per kilogram of dry pigment and at least a portion of sodium aluminate aqueous solution required to react with the phosphoric acid to form aluminum phosphate;
(d) adding any remaining aqueous sodium aluminate solution required to react with unreacted phosphoric acid to complete the formation of aluminum phosphate simultaneously with a solution of hydrochloric acid wherein the rate of addition of aluminate solution and that of the acid solution is adjusted so that the pH of the resulting mixture from and in this step (d) is maintained in a range from 5 to 8; and
(e) curing the mixture for from about 10 to 30 minutes;
(f) drying the mixture to form a treated pigment; and
(g) thermally treating the treated pigment for at least about 0.25 hour, at a temperature of about 300° C. to about 800° C.

DETAILED DESCRIPTION OF THE DISCLOSURE

The present disclosure provides a titanium dioxide pigment for use in making paper laminates. Titanium dioxide pigment made according to the present disclosure forms a stable slurry comprising up to 80% by weight pigment through the use of pH adjustment alone without the addition of chemical dispersants, thus simplifying the slurry composition and reducing the cost of making the slurry. Stable slurries of the pigment of the present disclosure can require a pH of just slightly more than 7.0, typically about 7.8 for slurries comprising 80% by weight pigment. Pigment of the present disclosure may be characterized by a large negative zeta potential at high pH. The pigment may exhibit an isoelectric point less than about pH 6.2.

In the process of making paper laminates, laminate papers are made which usually contain titanium dioxide as an agent to enhance paper opacity and brightness. The titanium dioxide may be first blended with water and the pH is controlled to form a slurry. This slurry may be then added to the blend of water and raw materials (pulp, pigments, chemicals, fillers, etc) on the paper machine which is eventually converted into dry paper.

In this disclosure, the titanium dioxide pigment is treated with a source of phosphorus, typically phosphoric acid. However, the pigment can be treated with any suitable source of phosphorus such as salts of tetrapyrophosphate, salts of hexametaphosphate, and salts of tripolyphosphate.

In this disclosure the titanium dioxide pigment is treated with a source of aluminum, typically sodium aluminate. However, the pigment can be treated with any alternative suitable source of aluminum. The pigment surface treatment of the present disclosure may range in composition from about 2.0 to about 4% by weight P reported as $P_2O_5$ and about 4 to about 6% by weight Al reported as $Al_2O_3$. More typical is a composition from about 2.5 to about 3.2% by weight P reported as $P_2O_5$ and about 4.6 to about 5.4% by weight Al reported as $Al_2O_3$.

The pigment of this disclosure may be characterized by an isoelectric point from pH about 5.4 to about 6.7, and a zeta potential at pH=9.0 of less than about negative 40 mV, typically from about negative 40 mV to about negative 50 mV.

The pigment of this disclosure may be characterized by its light fastness in a laminate structure. Light fastness is the ability of the pigment, incorporated into a laminate, to resist significant color change upon prolonged exposure to ultraviolet light.

Lightfastness of laminates containing the pigment of this disclosure is demonstrated by the delta E* value of the laminate. Laminates of this disclosure can exhibit a delta E* of less than about 2, typically from about 0.4 to about 1.5. Delta E* is determined using a standard calorimeter by the process described in the Delta E* Test Procedure used in the examples.

Hydroxyl groups of the pigment treated with a source of phosphorus and a source of aluminum, typically surface hydroxyl groups, can be the cause of poor lightfastness. In this disclosure processes for removing the hydroxyl groups are described. The thermal treatment described herein can remove hydroxyl groups. Alternatively, the hydroxyl groups can be removed by reaction with a compound that would remove the hydroxyl group, for example, by reaction with a compound containing a carboxyl group.

Pigment according to the present disclosure may be made as follows:

a. Prepare a slurry of titanium dioxide in water by mixing 4 parts titanium dioxide by weight on a dry basis and adjust the pH of this slurry to 7 using a base. A suitable base is sodium hydroxide. The amount of water in the slurry is not critical so long as it is fluid enough to provide good mixing as the treatment agents are added. For example, in a chloride titanium dioxide manufacturing process, oxidation reactor discharge slurry may be used as the slurry for treatment.

b. Heat the slurry from step a, to about 40° C.

c. Add at least one source of phosphorus and at least one source of aluminum to the heated slurry. Typically phosphoric acid and sodium aluminate are added. The source of phosphorus and source of aluminum can be added simultaneously. For example, materials for the treatment can be 2.05 parts of 85% by weight phosphoric acid, 6.66 parts of sodium aluminate solution at a concentration of 400 g per liter, and acid. A suitable acid is hydrochloric acid. Hydrochloric acid can be used at a concentration of from 10-40% percent by weight HCl. In one embodiment, the phosphoric acid and sodium aluminate are added simultaneously and at a rate to maintain the slurry pH at about 7 until all 2.05 parts of the phosphoric acid have been added to the slurry.

d. In another embodiment, at least a portion of the source of aluminum for reaction with the source of phosphorus is added first and the remaining source of aluminum and the acid are added at such rates that the pH of the slurry is maintained at 7. For example, at least a portion of the sodium aluminate aqueous solution for reaction with the phosphoric acid to form aluminum phosphate is added first and the remaining sodium aluminate solution (the remainder of the 6.66 parts) and the acid are added at such rates that the pH of the slurry is maintained at 7. Continue this addition until all 6.66 parts of the sodium aluminate has been added. Stir the mixture for from 10 to 30 minutes.

e. Dry the mixture, typically at low temperatures. The drying temperature can range from about 120° C. to about 220° C., more typically about 140° C. to about 180° C. and optionally micronize the dried pigment in a milling device to form a treated pigment. Some suitable milling devices include fluid energy mills such as micronizers available from Fluid Energy Processing & Equipment Company, Hatfield, Pa., or from Hosokawa Micron Pigment Systems, Summit, N.J. or Sturtevant, Inc. Hanover, Mass. and media mills available from Premier Mill, Delevan, Wis.

f. Thermally treat the dried pigment by exposing the pigment to an elevated temperature for a length of time sufficient to remove a significant fraction, typically greater than 80%, more typically greater than 90%, even more typically greater than 95%, of hydroxyl groups, in the form of water, from the treated pigment, typically the pigment surface. The quantity of these hydroxyl groups can be expressed as a fraction of the total pigment weight and can be detected by heating the pigment at a constant rate (typically 10° C. per minute) under air using thermogravimetric analysis (TGA). The quantity of these hydroxyl groups can be defined, for example, as the weight fraction of hydroxyls that leaves the pigment during TGA in the form of water at temperatures ranging between 120° C. and 500° C. The loss of hydroxyls would be largely complete by this temperature and sufficient for the purposes of this disclosure. However, a higher temperature would not be considered a drawback other than energy input. The temperature of many TGA units does not exceed 1000° C. Since any hydroxyl loss is probably complete at 800° C. higher temperatures would not be necessary. The improvement in light fastness of the pigment is expected to increase as greater fractions of these hydroxyl groups are removed from the pigment.

Typically, the pigment can be thermally treated for at least about 0.25 hour, more typically about 0.5 hour to about 1.0 hour, at a temperature of about 300° C. to about 600° C., more typically about 400° C. to about 500° C. While such temperatures are higher than the drying temperatures, they are sufficiently low to avoid loss of pigment brightness.

The thermally treated pigment exhibits an improvement in light fastness corresponding to a decrease in delta E* (color change) of at least about 40% compared to dried pigment which is not thermally treated. It can be important in the thermal treatment to maintain the dried, chemically treated pigment at the specified temperatures for the specified times to get the desired level of light fastness. The thermal treatment may be accomplished in a heated pneumatic conveyer, rotating kiln or any equipment that which achieve the same effect known to one skilled in the art.

Pigment can be treated with the source of phosphorus and source of aluminum by first adding the entire amount of the source of phosphorus and then adding the source of aluminum until the pH of the mixture is 7. For example, add the entire amount of phosphoric acid (in this case 2.05 parts) and then add sodium aluminate solution until the pH of the mixture is raised to 7. The remaining steps may be then carried out as described above.

The pigment from this process may typically be water dispersible requiring no addition other than pH adjustment in order to form stable slurries comprising up to 80% solids and shows excellent light fastness as tested according to methods used in testing raw material used in laminate papers and in paper laminates. The method of making the laminate papers or paper laminates is not critical in the performance of the pigment of the present disclosure.

In addition to lightfastness, it has also been found that the thermally treated pigments of this disclosure largely retain their brightness, as determined by comparing L* (a component of the widely used CIE L*a*b* color measurement system) of white laminates made with the treated and the untreated pigment. For example, a laminate coupon made using pigment heated in air for one hour at 500° C. exhibits an L* value of about 91.2, while a laminate coupon made using untreated starting pigment exhibits an L* value of about 91.5.

In the preferred high pressure laminates of the disclosure, the laminates are produced by pressing several impregnated layered papers. The structure of these molded laminated materials consists in general of a transparent layer (overlay) which produces an extremely high surface stability, a decorative paper impregnated with a synthetic resin and one or more kraft papers impregnated with a phenolic resin. Molded fiber board and particle board or plywood can be used as the substrate.

The decorative base paper contains a pigment mixture of the treated titanium dioxide pigment of this disclosure. The amount of titanium dioxide in the pigment mixture can up to 55 wt. %, in particular from about to about 50 wt. % or from 20 to about 45 wt. %, based on the weight of the paper. The pigment mixture may contain fillers such as zinc sulfide, calcium carbonate, kaolin or mixtures thereof.

Softwood pulp (long-fiber pulp) or hardwood pulp (short-fiber pulp) or a combination thereof may be used as the cellulose pulp for producing the decorative bulk paper.

Wet strength resins well known in the art of laminate paper-making may also be used.

The decorative bulk paper can be produced on typical equipment well known in the art of laminate papermaking by the high-pressure process.

The decorative base paper can be impregnated with the conventional synthetic resin dispersion, typically a dispersion of melamine formaldehyde resin. The amount of resin introduced into the decorative base paper by impregnation can range from 25 to 30% based on the weight of the paper.

After drying the impregnated paper can also be coated and printed and then applied to a substrate such as a wooden board.

In one embodiment, the invention herein can be construed as excluding any element or process step that does not materially affect the basic and novel characteristics of the composition or process. Additionally, the invention can be construed as excluding any element or process step not specified herein.

Applicants specifically incorporate the entire content of all cited references in this disclosure. Further, when an amount, concentration, or other value or parameter is given as either a range, more specific range, or a list of upper values and lower values, this is to be understood as specifically disclosing all ranges formed from any pair of any upper range limit or more specific value and any lower range limit or specific value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

EXAMPLES

Delta E* Test Procedure. In the following Examples, Delta E* was determined using the following test procedure. The color of laminate coupons made as described in Example 1 was measured using a standard calorimeter. These coupons were exposed continuously to xenon arc radiation for a period of 72 hours in an Atlas ci3000 fadeometer manufactured by Atlas Material Testing Technology LLC, Chicago, Ill.; with irradiance 1.1 W/m$^2$ at the wavelength 420 nm and black panel temperature 63° C. The color of each exposed coupon was measured immediately after removal from the fadeometer, and the color difference compared to the pre-exposed values was computed to yield a delta E* value for each coupon.

Example 1

A treatment was applied to rutile $TiO_2$ using the following procedure:

2000 g of dry titanium dioxide pigment were mixed with 4600 g of water to form a mixture and the pH of the mixture was then adjusted to about 7 by adding aqueous sodium hydroxide. This mixture was then heated to a temperature of about 40° C. 87 g of phosphoric acid and a sufficient quantity of sodium hydroxide solution to maintain pH at about 7 were simultaneously added to the heated mixture. Aqueous sodium aluminate solution sufficient to deliver an equivalent of 93 g of aluminum oxide was then added simultaneously to the heated mixture with a sufficient quantity of hydrochloric acid to maintain pH at about 7 to complete the formation of aluminum phosphate. The mixture was then dried at 130° C. in an air convection oven to form a dry cake having an overall pigment composition of about 2.9% $P_2O_5$, 5.2% $Al_2O_3$, and 91.9 $TiO_2$ as measured by x-ray fluorescence.

Following drying, this pigment was split into two parts. The first part, "Control 1," was set aside while the second part was heated in air for 60 minutes at 400° C. and then cooled in air, resulting in pigment "Sample 1." High-pressure laminate coupons were made separately using the "Control 1" and "Sample 1" pigments. These laminate coupons were made by dipping ashless filter paper into a slurry of TiO2 pigment in a 50% aqueous solution of a standard melamine formaldehyde resin intended for high-pressure laminates. The slurry contained 9% TiO2 pigment by weight, 45% water, and 45% melamine formaldehyde. Excess slurry on the surface of the dipped paper was wiped away with a plastic rod. After drying for 7 minutes at 110° C., the impregnated paper was laminated together with three kraft paper core layers, a backing layer, and a melamine formaldehyde surface overlay at 145° C. for about one hour, followed by cooling.

The results of measuring Delta E* of coupons made in accordance with this Example 1 are shown below:

| Sample | Delta E* |
|---|---|
| Control 1 | 3.9 |
| Sample 1 | 0.8 |

Example 2

Example 1 was repeated with the following exception: the Sample 2 pigment was heated in air for 60 minutes at 500° C. The delta E* results are shown below:

| Sample | Delta E* |
|---|---|
| Control 1 | 3.9 |
| Sample 2 | 0.8 |

Example 3

Example 1 was repeated with the following exception: the Sample 3 pigment was heated in air for 60 minutes at 600° C. The delta E* results are shown below:

| Sample | Delta E* |
|---|---|
| Control 1 | 3.9 |
| Sample 3 | 1.1 |

Example 4

Example 1 was repeated with the following exception: the Control 1 and Sample 4 samples were micronized following the drying step. Additionally, Sample 4 was heated in air for 60 minutes at 400° C. The delta E* results are shown below:

| Sample | Delta E* |
|---|---|
| Control 4 | 2.0 |
| Sample 4 | 0.8 |

It can be seen that the micronization step improves light fastness, as seen in the difference between Control 1 and Control 4. However, the thermal treatment significantly improves light fastness. From the results provided in these Examples, heating the pigment for one hour at 400° C. gives the significant fastness performance shown in Examples 1 to 4.

Example 5

A quantity of the dry titanium dioxide pigment as described in Example 1 was heated in air for 60 minutes at 400° C. This pigment, designated Sample 5, did not undergo the additional surface treatment described in Example 1 and thus consisted of nearly pure (at least 99.0%) titanium dioxide. The delta E* value is shown below:

| Sample | Delta E* |
|---|---|
| Sample 5 | 4.2 |

It can be seen that heating titanium dioxide pigment which lacks the additional surface treatment described in Example 1 in air for 60 minutes at 400° C. does not lead to improved light fastness compared to Control 1. These Examples show that the combination of additional surface treatment and the supplemental heating step is needed to impart significantly improved-light fastness to these pigments.

The description of illustrative and preferred embodiments of the present invention is not intended to limit the scope of the invention. Various modifications, alternative constructions and equivalents may be employed without departing from the true spirit and scope of the appended claims.

What is claimed is:

1. A process for making a decorative base paper for a paper laminate comprising impregnating a base paper with a pigment mixture of titanium dioxide and water wherein the titanium dioxide pigment is made by:
   (a) contacting titanium dioxide pigment with water to form a mixture having a pigment concentration of from about 14 to 40 weight percent based on the weight of the mixture then adjusting the pH of this mixture to about 7 with aqueous sodium hydroxide;
   (b) heating the mixture to a temperature of about 40° C.;
   (c) adding to the heated mixture at a rate such that the pH of the resulting mixture is maintained at about 7 throughout this step (c) from about 0.15 to 0.65 moles of phosphoric acid per kilogram of dry pigment and at least a portion of sodium aluminate aqueous solution required to react with the phosphoric acid to form aluminum phosphate;
   (d) adding any remaining aqueous sodium aluminate solution required to react with unreacted phosphoric acid to complete the formation of aluminum phosphate simultaneously with a solution of hydrochloric acid wherein the rate of addition of aluminate solution and that of the acid solution is adjusted so that that the pH of the resulting mixture from and in this step (d) is maintained in a range from 5 to 8;
   (e) drying the mixture to form a dried treated pigment; and
   (f) thermally treating the dried treated pigment for at least about 0.25 hour at a temperature of about 300° C. to about 800° C. to form a thermally treated pigment; whereby the thermally treated pigment exhibits an improvement in light fastness corresponding to a decrease in delta E* (color change) of at least about 40%, based on the delta E* value of the dried treated pigment of step (e).

2. The process of claim 1 further comprising between steps (e) and (f), micronizing the dried treated pigment.

3. The process of claim 1 wherein in step (c), the addition of phosphoric acid and aqueous sodium aluminate is simultaneous.

4. The process of claim 1 wherein in step (c), the addition of phosphoric acid and aqueous sodium aluminate is sequential, with phosphoric acid being added first.

5. The process of claim 1 wherein in step (c), the addition of aqueous sodium aluminate is made so that the ratio of the moles of phosphorous added to the moles of aluminum added is from about 0.2 to about 0.9.

6. The process of claim 1 wherein in step (c), the addition of the amount of phosphoric acid is from about 0.23 to 0.52 moles per kilogram of pigment.

7. The process of claim 1 wherein the titanium dioxide pigment is rutile.

* * * * *